Patented July 2, 1940

2,206,428

UNITED STATES PATENT OFFICE 2,206,428

REFRIGERATING APPARATUS

Andrew B. Reavis, Swarthmore, Pa., assignor to Westinghouse Electric & Manufacturing Company, East Pittsburgh, Pa., a corporation of Pennsylvania Application November 27, 1937, Serial No. 176,877

4 Claims. (Cl. 62—2)

My invention relates to refrigerating apparatus, more particularly to refrigerating apparatus of the vapor or steam jet type, and it has for an object to provide improved apparatus.

It is an object of my invention to improve the economy of operation of refrigerating apparatus of the vapor jet type wherein the fluid to be cooled is not directly subjected to partial evaporation but is conveyed in heat transfer relation to liquid which is cooled by partial evaporation in an evaporator.

In the patents of Kothny 1,418,002 and Schmidt 1,483,990, there is disclosed and claimed refrigerating apparatus of the stage cooling type. The liquid to be cooled is conveyed in series through a plurality of evaporator chambers, in each of which it is partially cooled by evaporation of a portion of the liquid. The chambers operate at successively lower pressures, so that greater economy of operation is effected than when the cooling to the final temperature is effected in a single evaporator chamber.

It is a particular object of my invention to provide the improved economy of operation of stage cooling in refrigerating apparatus wherein the fluid to be cooled is conveyed in heat transfer relation to liquid which is cooled by partial evaporation.

In accordance with my invention, I provide refrigerating apparatus of the vapor jet type comprising a plurality of evaporator chambers. A group of heat transfer elements, such as a bank of tubes, is provided in each evaporator chamber and the several groups are connected in series for flow of fluid to be cooled. Provision is made in each chamber for supplying a film of liquid, preferably water, on the outer surfaces of the tubes. Such provision includes a pump common to the several chambers and conduit means for draining the unevaporated water from the several evaporator chambers to the pump.

Figure 1:
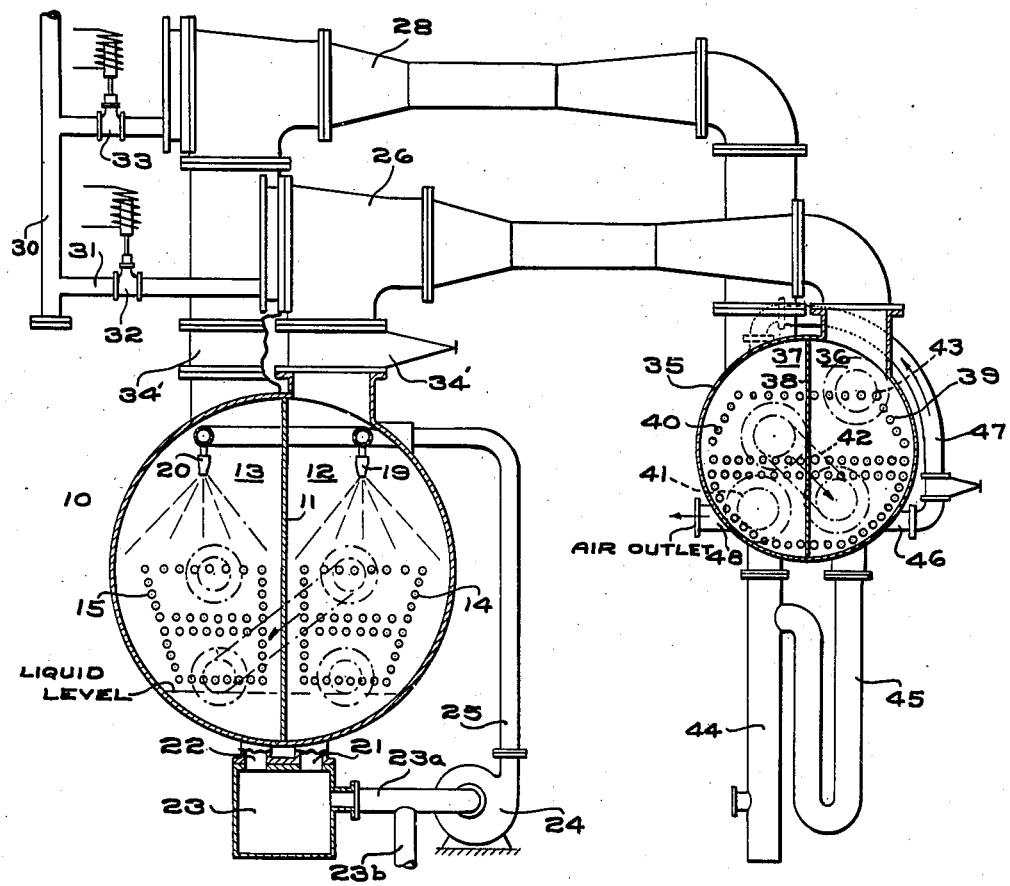
Figure 2:
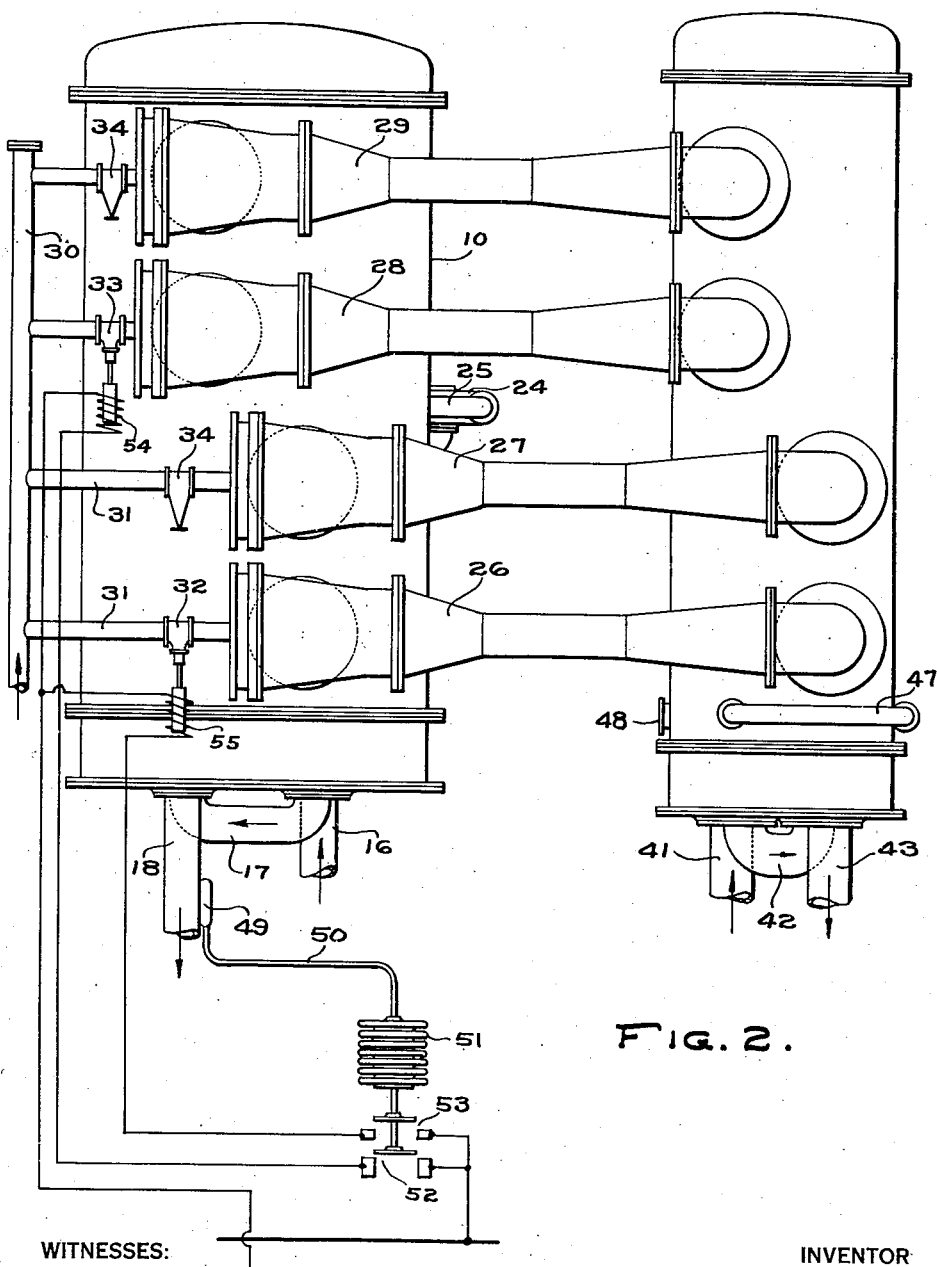

The above and other objects are effected by my invention as will be apparent from the following description and claims taken in accordance with the accompanying drawings, forming a part of this application, in which:

Fig. 1 is a side elevation, partly in section, of apparatus embodying my invention; and Fig. 2 is a plan view thereof.

Referring to the drawings in detail, I show an evaporator or cold tank 10 having a partition 11 dividing the interior thereof into chambers 12 and 13. A bank of tubes 14 extends through the chamber 12, and a bank of tubes 15 extends through the chamber 13. The water or other fluid to be cooled is conveyed through the tube banks 14 and 15 in series. It is delivered to the evaporator unit through a conduit 16 (see Fig. 2), flows through the lower half of the tube bank 14 in one direction and through the upper half in the opposite direction. It is then conveyed through a conduit 17 to the lower half of the tube bank 15 through which it flows in one direction and then through the upper portion in the opposite direction. It is then discharged to a conduit 18, from which it is conveyed to the point of use.

A film of water is provided on the outer surfaces of the tubes 14 and 15. Such film of water is preferably provided by spraying water onto the tube banks, for which purpose groups of spray nozzles 19 and 20 are provided in the chambers 12 and 13, respectively. The water which is not evaporated on the surfaces of the tubes collects in the bottom of the chambers 12 and 13 and flows by gravity through connecting conduits 21 and 22 to a well 23. From the latter, it flows through a conduit 23a to a pump 24 which delivers the same under pressure through a conduit 25 to the spray nozzles 19 and 20. Make-up water, to replace the water evaporated, is admitted in any suitable manner. For example, it may be supplied through a conduit 23b to the conduit 23a.

To remove the water vapor from the evaporator chambers, steam motivated ejectors are provided. Two ejectors 26 and 27 have their suction inlets connected to the chamber 12 and two ejectors 28 and 29 have their suction inlets connected to the chamber 13. Motive fluid, such as steam under pressure, is supplied to the several jets for motivating the same through a steam main 30 and branch conections 31. Suitable valves are provided in the connecting conduits 31 in order that the ejectors may be individually rendered operable or inoperable. Solenoid operated valves 32 and 32 are provided for the ejectors 26 and 28, respectively, while manually actuated valves 34 are provided for the ejectors 27 and 29.

A valve 34' is provided between the suction inlet of each ejector and the associated evaporator chamber to cut off reverse flow therethrough when the ejector is shut down. The actuation of the valve 34' is correlated to the actuation of the steam valves, in a manner known prior to my invention (for example, as described and claimed in Patent No. 2,129,097 of D. W. R. Morgan, dated September 6, 1938) and which need not, therefore, be considered here, it being sufficient to state that each valve 34' is closed whenever the associated ejector is not effective to withdraw vapor from the evaporator chamber.

The ejectors discharge into a condenser 35, which is shown as a surface condenser. The condenser 35, is preferably divided into two chambers 36 and 37, by a partition 38. The ejectors 26 and 27 discharge into the chamber 36 and the ejectors 28 and 29 discharge into the chamber 37. The chamber 36 contains a bank of tubes 39 and the chamber 37 contains a bank of condenser tubes 40. Cooling water is conveyed through these tubes to condense the vapor exhausted from the ejectors, the cooling water being circulated through the tube banks 40 and 39 in series. The cooling water may be supplied, for example, through a conduit 41, flow through the lower portion of the tube bank 40 in one direction and then through the upper portion in the opposite direction. A conduit 42 conveys the cooling water to the lower portion of the tube bank 39, through which it flows in one direction and then through the upper portion in the opposite direction. From the latter, it is discharged through a conduit 43.

Inasmuch as the temperature of the cooling water flowing from the tube bank 40 to the tube bank 39 has been increased due to the heat that it has absorbed in the tubes 40, the vapor pressure maintained in the chamber 36 is higher than that maintained in the chamber 37. Provision is made in the condensate removal means and the air removal means for maintaining such pressure difference. The condensate collecting in the chamber 37 is drained by gravity into a conduit 44 while the condensate collecting in the chamber 36 is conveyed to the conduit 44 through a conduit 45 arranged in the form of a loop to provide a hydrostatic or liquid seal.

The air outlet 46 for the chamber 36 is connected through a conduit 47 to the chamber 37 so that the air and condensable gases collecting in the chamber 36 are vented to the chamber 37 by the pressure difference existing therein. The chamber 37 is provided with an air outlet 48 connected to any suitable air removal means.

If automatic control of the ejectors is desired, it is preferably effected in response to the temperature of the cooled water discharged in the conduit 18. Such control includes a thermostatic bulb 49 subjected to the temperature of the water discharged from the conduit 18 and connected by a tube 50 to a bellows 51. The latter is connected to contacts 52 and 53, which are closed successively upon increase in temperature. The contacts 52 control a solenoid 54 connected to the steam valve 33 of the ejector 28 and the contacts 53 control a solenoid 55 which actuates the steam valve 32 of the ejector 26.

Operation

Assume first that at least one ejector of each of the chambers 12 and 13 is in operation and is effective to reduce the pressure therein by removing vapor from the chamber. The reduced pressure lowers the boiling point of the water sprayed onto the tubes therein, and a portion of the water is vaporized by the heat extracted from the water flowing through the tubes.

Since more water is sprayed onto the tubes than is immediately evaporated, the excess drains from the chambers 12 and 13 to the well 23 and is recirculated by the pump 24 to the spray nozzles 19 and 20.

The water flowing through the tubes 14 and 15 is thus cooled in stages, so that the temperature of the water flowing through the tubes 14 is lower than the temperature of the water flowing through the tubes 15. Because of this difference in temperature, the vapor pressure maintained in the chamber 12 is higher than the vapor pressure maintained in chamber 13.

The ejectors 28 and 29 connected to the evaporator chamber 13 containing the lower evaporator pressure, discharge into the condenser chamber 37 in which there is maintained the lower condensing pressure. The ejectors 26 and 27 are connected to the evaporator chamber 12 containing the higher evaporating pressure and exhaust to the condenser chamber 36 containing the higher condensing pressure. This arrangement provides a more nearly uniform compression ratio for the two groups of ejectors.

The above described apparatus provides operation at high economy due to the higher evaporator pressure maintained in the chamber 12, which enables the ejectors connected thereto to provide removal of a greater quantity of vapor for a given quantity of steam than if the chamber 12 operated at the same pressure as the chamber 13. If the tubes 14 and 15 were disposed in a common chamber, such chamber would necessarily operate at the lowest evaporator pressure in order to cool the water flowing through the tubes down to the desired low temperature.

It will be noted that the connecting conduits 21 and 22 are arranged to provide a hydrostatic seal between the chambers 12 and 13, in order to permit different pressures to be maintained therein. The difference in pressures effects some difference in liquid level therein, but the difference in liquid level is very small.

When the cooling load is sufficiently low, only one ejector may be operated. In such case, water is cooled in the tubes of only one evaporator chamber and flows through the tubes of the other evaporator chamber without being cooled.

Referring to the control of the ejectors, operation of one or both of the ejectors 27 and 29 may be effected by means of the manually controlled valves 34 to provide for the base or minimum load. The variations in load are taken by the automatic ejectors 26 and 28. Upon increase in temperature of the water being cooled, the bellows 51 expands and first closes the contacts 52 to effect operation of the ejector 28 and then closes the contacts 53 to start the ejector 26. Upon decrease in temperature, the ejector 26 is first shut down and then the ejector 28.

While I have shown my invention in but one form, it will be obvious to those skilled in the art that it is not so limited but is susceptible of various changes and modifications without departing from the spirit thereof, and I desire, therefore, that only such limitations shall be placed thereupon as are imposed by the prior art or as are specifically set forth in the appended claims.

What I claim is:

1. In refrigerating apparatus, the combination of a plurality of evaporator chambers; conduit means in each chamber; a fluid translating element associated with each chamber for withdrawing vapor therefrom to effect cooling by partial evaporation of liquid; means for wetting the exterior surfaces of said conduit means including a pump common to said chambers, means for conveying unevaporated liquid from said chambers to said pump and arranged to form a liquid seal between said chambers, and means for conveying liquid from said pump to the exterior surfaces of said conduit means in the respective chambers in parallel; and means for conveying fluid to be cooled through the conduit means in the several chambers in series, whereby said fluid is cooled in stages and said chambers operate at successively lower pressures.

2. In refrigerating apparatus, the combination of a plurality of evaporator chambers; conduit means in each chamber; an ejector associated with each chamber for withdrawing vapor therefrom to effect cooling by partial evaporation of liquid; means for wetting the exterior surfaces of said conduit means including a pump common to said chambers, means for conveying unevaporated liquid from said chambers to said pump and arranged to form a liquid seal between said chambers, and means for conveying liquid from said pump to the exterior surfaces of said conduit means in the respective chambers in parallel; and means for conveying fluid to be cooled through the conduit means in the several chambers in series, whereby said fluid is cooled in stages and said chambers operate at successively lower pressures.

3. In refrigerating apparatus, the combination of first and second evaporator chambers; conduit means in each chamber; first and second fluid translating elements connected to said first and second chambers, respectively, for withdrawing vapor therefrom to effect cooling by partial evaporation of liquid; means for supplying liquid to the outer surfaces of the conduit means in the several chambers including a pump common to said chambers, means for conveying unevaporated liquid from said chambers to said pump and arranged to form a liquid seal between said chambers, and means for conveying liquid from said pump to the exterior surfaces of said conduit means in the respective chambers in parallel; means for conveying liquid to be cooled through the conduit means of the first and second chambers in series in the order named, whereby said liquid is cooled in stages and said chambers operate at successively lower pressures; first and second condensing chambers connected to said first and second translating elements, respectively, for receiving the fluid exhausted therefrom; and means for conveying cooling fluid in heat transfer relation to said second and first condensing chambers in series in the order named, whereby said second condenser chamber operates at lower pressure than said first condenser chamber.

4. In refrigerating apparatus, the combination of a plurality of evaporator chambers sealed from each other, conduit means in each chamber, an ejector connected to each chamber for withdrawing vapor therefrom to effect cooling by partial evaporation of liquid, means for supplying liquid to the outer surfaces of the conduit means in the several chambers, the conduit means in one of the evaporator chambers being connected in series with the conduit means in another of the evaporator chambers, whereby said liquid is cooled in stages and said chambers operate at successively lower pressures, and means for automatically controlling one of said ejectors in response to demand for cooling of liquid flowing through said conduit means.

ANDREW B. REAVIS.